(12) United States Patent
Cariou et al.

(10) Patent No.: US 10,027,393 B2
(45) Date of Patent: Jul. 17, 2018

(54) BEAMFORM TRAINING AND OPERATION FOR MULTIPLE SINGLE-INPUT SINGLE-OUTPUT LINKS

(71) Applicant: Intel IP Corporation, Santa Clara, CA (US)

(72) Inventors: Laurent Cariou, Portland, OR (US); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 140 days.

(21) Appl. No.: 14/757,667

(22) Filed: Dec. 23, 2015

(65) Prior Publication Data

US 2017/0187437 A1 Jun. 29, 2017

(51) Int. Cl.
| | |
|---|---|
| *H04L 12/56* | (2006.01) |
| *H04B 7/0495* | (2017.01) |
| *H04L 1/20* | (2006.01) |
| *H04L 1/12* | (2006.01) |
| *H04W 74/08* | (2009.01) |

(52) U.S. Cl.
CPC ............. *H04B 7/0495* (2013.01); *H04L 1/12* (2013.01); *H04L 1/20* (2013.01)

(58) Field of Classification Search
CPC ..... H04W 48/18; H04W 36/30; H04W 24/08; H04W 16/14
USPC .......................................... 370/329; 455/434
See application file for complete search history.

(56) References Cited

U.S. PATENT DOCUMENTS

| | | | | |
|---|---|---|---|---|
| 6,628,639 | B1 * | 9/2003 | Ishii ...................... | H04W 76/02 370/333 |
| 7,539,169 | B1 * | 5/2009 | O'Hara, Jr. ........... | H04W 48/06 370/338 |
| 8,270,979 | B1 * | 9/2012 | Vargantwar ....... | H04W 36/0083 370/331 |
| 2011/0218008 | A1 | 9/2011 | Sim et al. | |
| 2011/0274054 | A1 * | 11/2011 | Cordeiro ............... | H04L 1/0015 370/329 |
| 2014/0119300 | A1 * | 5/2014 | Aboul-Magd ........ | H04L 5/0057 370/329 |
| 2014/0126620 | A1 | 5/2014 | Maltsev et al. | |

(Continued)

FOREIGN PATENT DOCUMENTS

JP 2012524459 10/2012

OTHER PUBLICATIONS

International Searching Authority, "International Search Report and Written Opinion," issued in connection with application No. PCT/US2016/062879, dated Mar. 3, 2017, 12 pages.

*Primary Examiner* — Charles C Jiang
*Assistant Examiner* — Will Lin
(74) *Attorney, Agent, or Firm* — Hanley, Flight & Zimmerman, LLC

(57) ABSTRACT

Methods and apparatus to operating multiple single-input single-output beamform links. An example method includes determining strengths of a first wireless link between a first transmission sector and a first receiver sector and a second wireless link between a second transmission sector and a second receiver sector, determining whether the first and second wireless links is busy or idle, selecting an idle wireless link of the plurality of wireless links based on the strengths of the first and second wireless links that are idle, and establishing a transmission connection with the selected idle wireless link.

20 Claims, 10 Drawing Sheets

(56) References Cited

U.S. PATENT DOCUMENTS

| | | | |
|---|---|---|---|
| 2014/0194116 A1* | 7/2014 | Jalloul | H04B 7/0805 |
| | | | 455/434 |
| 2015/0103756 A1 | 4/2015 | Sinha | |
| 2015/0163824 A1* | 6/2015 | Krzymien | H04W 28/18 |
| | | | 370/338 |
| 2016/0183182 A1* | 6/2016 | Jain | H04W 48/20 |
| | | | 370/329 |
| 2017/0041959 A1* | 2/2017 | Itagaki | H04W 74/0816 |

* cited by examiner

BEAMFORM TRAINING AND OPERATION FOR MULTIPLE SINGLE-INPUT SINGLE-OUTPUT LINKS

FIELD OF THE DISCLOSURE

This disclosure relates generally to wireless communication and, more particularly, to methods and apparatus for operating multiple single-input single-output links.

BACKGROUND

Wireless communication networks establish a wireless connection to transmit data between a source station (e.g., a router, etc.) and a destination station (e.g., a computing device, a mobile device, etc.). In some wireless communication networks, source stations propagate electromagnetic signals isotropically (e.g. in all directions) to transmit data to any destination station within the range of the propagating signal. However, the range of the isotropic propagating signal is relatively small. To increase the range and strength of the propagating signal, source stations may be structured to beamform the propagating signal. Beamforming concentrates the propagating signal in one or more directions (e.g., paths) to create a more powerful propagating signal in the prescribed directions.

DETAILED DESCRIPTION

Figure 1:
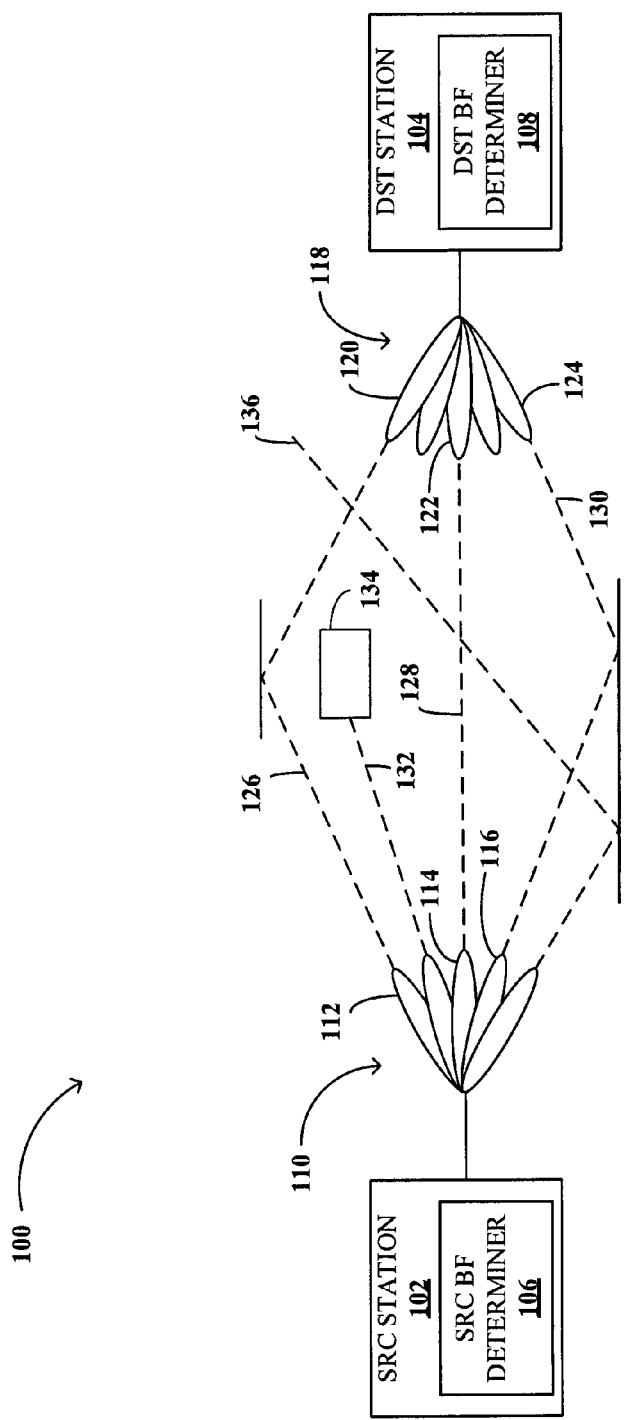
FIG. 1 is an example illustration of communications between an example source station and an example destination station.

Beamforming wireless network systems wirelessly transmit data from a source station (e.g. a router, etc.) to a destination station (e.g., a computing device, a mobile device, etc.) using a concentrated electromagnetic signal that travels in substantially one direction. In a single-input single-output (SISO) beamforming system, one transmission sector of a source antenna from a source station (e.g. a single input) transmits data to one receiver sector (e.g., a single output) of a destination antenna from a destination station. In such systems, the wireless link (e.g., connection) between a transmission sector and a receiver sector is a beamform link. Because each of the transmission sectors of the source antenna may connect with exactly one of the receiver sectors of the destination antenna (creating multiple different beamform links), conventional techniques will select only the strongest beamform link to facilitate data transmission (e.g., communication) between the source station and the destination station. Using such conventional techniques, if the selected beamform link is busy and data communication cannot occur, the transmission will be cancelled and the transmission data is lost.

Examples disclosed herein rank available beamform links based on signal strength and, if the strongest beamform link is busy, facilitate communication through a weaker, idle beamform link. For example, a source station initializes communication with a destination station by transmitting transmission packets through multiple transmission sector of a source antenna associated with the source station. In such an example, a destination station receives one or more transmission packets in one or more receiver sectors of a destination antenna associated with the destination station. Each receiver sector that receives a transmission packet through a particular beamform link transmits a response packet back to the source station.

In some examples, the transmission packets include a beamform ID and/or a transmission sector ID. The example destination station responds to receipt of a packet including an ID by transmitting response packets back to the source station using the same beamform links used to receive the transmission packets. In some examples, the response packets include the beamform ID, the transmission sector ID, and/or a receiver sector ID. In some examples, the source station correlates the beamform ID, the transmission sector ID, and/or the receiver sector ID. After receiving the response packets, the source station determines which beamform links have been established and ranks the beamform link based on the signal strength of each of the beamform links. In some examples, the source station omits beamform links from the ranking that are below a threshold strength.

Using examples disclosed herein, the source station checks the strongest beamform link to determine if the beamform link is busy or idle. If the beamform link is idle, the source station sends a request-to-send signal to the destination source. However, if the beamform link is busy, the source station checks the next strongest link to determine if the second beamform link is busy or idle. The status check (e.g., busy or idle) process continues until the source station has selected the strongest idle beamform link. In some examples, the source station checks the status (e.g., idle or busy) for all of the beamform links simultaneously. Once an idle beamform link is selected, the source station transmits the request-to-send signal to the destination station using the selected beamform link. In some examples, the request-to-send signal includes data related to the beamform link (such as an identifier) and/or the beamform link strength ranking. The destination station receives the request-to-send signal and checks all of the beamform links to either (1) verify that the selected beamform link is still idle or (2) find a stronger beamform signal that was busy previously but is now idle. The destination station sends a clear-to-send signal back to the source station using the strongest idle beamform link (such as an identifier). In some examples, the clear-to-send signal includes data relating to the strongest idle beamform link. Once the source station receives the clear-to-send signal, the source station begins data transmission based on the beamform link associated with the clear-to-send signal.

FIG. 1 is an example environment 100 illustrating communication between an example source (SRC) station 102 and an example destination (DST) station 104 in a wireless local area network (WLAN). Alternatively, the example environment 100 may illustrate communication within any type of wireless network. The example SRC station 102 includes an example SRC beamform (BF) determiner 106 and the example DST station 104 includes an example DST BF determiner 108. An example SRC antenna 110 includes example transmission (Tx) sectors three of which are shown at reference numerals 112, 114, 116 and an example DST antenna 118 includes example receiver (Rx) sectors three of which are shown at reference numerals 120, 122, 124. The example Tx sectors and Rx sectors facilitate example BF links 126, 128, 130, 132, 136, where the example BF link 132 is blocked by an example object 134.

The example SRC station 102 includes one or more electrical devices that wirelessly transmit data to other electrical devices. In the example environment 100, the example SRC station 102 is a 60 gigahertz (GHz) single-input single-output (SISO) beamform WLAN (e.g., Wi-Fi) router. Alternatively, the example SRC station 102 may be any type of transmission station and/or antenna with any number of inputs and/or outputs operating at any frequency. In some examples, the SRC station 102 may include a power source (e.g., a battery, a plug, etc.) to power the SRC station 102. The example SRC station 102 operates with other electrical devices (e.g., the example DST station 104) to facilitate communication using an optimal beamform link, as further described herein.

The example DST station 104 includes one or more electrical devices that wirelessly receive data from a transmission station (e.g., the example SRC station 102). The example DST station 104 may be a computer, a mobile device, a game counsel, a smart TV, a tablet, and/or any computing device capable of receiving data from a transmission. In some examples, the example DST station 104 may include a power source (e.g., a battery, a plug, etc.) to power the DST station 104. The example DST station 104 operates with other electrical devices (e.g., the example SRC station 102) to facilitate communication using an optimal idle BF link, as further described herein.

The example SRC BF determiner 106 determines which example BF link 126, 128, 130 to utilize to transmit data to the example DST station 104. The example SRC BF determiner 106 ranks the BF links 126, 128, 130 based on the connection strength of each BF link 126, 128, 130, runs a clear channel assessment (CCA) for the strongest BF links 126, 128, 130 (e.g., to check the status of the strongest BF link 126, 128, 130), transmits a request-to-send (RTS) using a first selected BF link, receives a clear-to-send (CTS) using a second selected BF link, and sends data to a destination station using the second selected BF link. In some examples, the first selected BF link is the same as the second selected BF link. In some examples, the first selected BF link is the same as the second selected BF link. For example, if the first select BF link is not idle by the time the second BF link is selected, the second selected BF link is not the same as the first selected BF link.

DST BF determiner 108 receives a RTS from a transmission station, such as the SRC station 102. In some examples, the DST BF determiner 108 runs a CCA for the BF link associated with the received RTS. If the BF link is busy, the example DST BF determiner 108 may choose a different BF link to respond the RTS. In response to receiving a RST, the example DST BF determiner 108 sends a CTS using an idle BF link to the device that sent the RTS. Additionally, once the CTS is sent, a connection is established and the DST BF determiner 108 receives transmission data from the device associated with the received RTS.

The example SRC BF antenna 110 includes one or more conductors to output electromagnetic waves (e.g., radio waves) produced by the example SRC BF determiner 106. The example SRC BF antenna 110 may be enclosed within the SRC station 102 or may be attached externally to the SRC station 102. The example SRC BF antenna 110 includes the example transmission (Tx) sectors 112, 114, 116. Alternating current (AC) current generated by the example SRC BF determiner 106 excites one of the example Tx sectors 112, 114, 116 of the example SRC BF antenna 110 to transmit the electromagnetic signals at a set frequency. By transmitting the electromagnetic signals using one example Tx sectors 112, 114, 116 the example SRC BF antenna 110 concentrates the electromagnetic signal in one direction. Concentrating the electromagnetic signal in one direction produces a strong connection between the example SRC station 102 and the example DST station 104. Additionally, the example SRC BF antenna 110 receives electromagnetic waves produced by other electronic devices (e.g., the example DST station 104).

The example DST BF antenna 118 includes one or more conductors to intercept electromagnetic waves (e.g., radio waves) transmitted by the example SRC BF station 102. The example DST BF antenna 118 may be enclosed within the DST station 104 or may be attached externally to the DST station 104. The example DST BF antenna 118 includes the example receiver (Rx) sectors 120, 122, 124. The example DST BF antenna 118 receives the electromagnetic signals at a set frequency using one or more of the example Rx sectors 120, 122, 124. By receiving the electromagnetic signals using the one or more example Rx sectors 120, 122, 124, the example DST BF antenna 118 may receive the electromagnetic signal from a further distance than a directional signal. Additionally, the example DST BF antenna 118 produces and transmits electromagnetic waves to other electronic devices (e.g., the example SRC station 102).

Each of the example Tx sectors 112, 114, 116 communicates with one the example Rx sectors 120, 122, 124 through one of the example BF links 126, 128, 130. For example, the Tx sector 112 communicates with the example Rx sector 120 through the example BF link 126. Each of the example BF links 126 have its own associated strength depending on where the example DST BF antenna 118 is located in relation to the example SRC BF antenna 110. In some examples, the BF links (e.g., the example BF links 126, 130) reflect off an object, such as a wall.

In operation, the example SRC BF determiner 106 determines the strength of each of the example BF link 126, 128, 130. The strength of each BF link 126, 128, 130 is determined when the example SRC station 102 sends transmission packets using all of the example Tx sectors 112, 114, 116 to all of the example Rx sectors 120, 122, 124 of the example DST station 104. As shown in the example environment 100, not all of the example Tx sectors connect, via a BF link, to a Rx sector. A connection (e.g., BF link) may not exist due to an object (e.g., such as the example object 134) blocking the BF link path (e.g., such as the example BF link 132), a Tx sector not aligning with an Rx sector (e.g., such as the example BF link 136), etc. In response to receiving the transmission packets, the example DST station 104 sends response packets using all of the example Rx sectors (e.g., the example Rx sectors 120, 122, 124) that received a transmission packet. The example SRC BF determiner 106 determines the strength of the example BF links 126, 128, 130 based on the strength of the signals associated with the response packets. The SRC BF determiner 106 may determine the strength based on the signal-to-noise (SNR) ratio and/or the received signal strength indicator (RSSI) of the response packet signals.

Once the example SRC BF determiner 106 determines the strength of each BF link, the SRC BF determiner 106 ranks the example BF links 126, 128, 130 based on strength. For example, the strongest BF link will be ranked first, the next strongest link will be ranked second, etc. In some examples, the SRC BF determiner 106 may omit any BF link below a threshold strength from the ranking. For example, a BF link may be below the threshold if an object is partially blocking the path of the BF link, the path of the BF link is long, etc. In the example environment 100, BF links 126, 128, and 130 are above the threshold strength. In some examples, the SRC BF determiner 106 ignores any BF link below the threshold strength prior to ranking the BF links. The strength threshold may be based on user and/or manufacture preferences.

Once the example BF links 126, 128, 130 are ranked based on strength, the example SRC BF determiner 106 runs a CCA using the optimal (e.g., highest ranked) BF link 126, 128, 130. For example, if the example BF link 128 is the strongest, the example BF link 130 is the second strongest, and the example BF link 126 is a third strongest, then the SRC BF determiner 106 runs a CCA on the example BF link 128. The CCA determines whether the BF link 128 is busy or idle. If the BF link 128 is busy, then the BF link 128 cannot be used to communicate with the example DST station 104 and the example SRC BF determiner 106 runs a CCA on the next strongest BF link (e.g., the example BF link 130). If the BF link 128 is idle, then the BF link 128 can be used to communicate with the example DST station 104 and the example SRC BF determiner 106 sends a RTS to the example DST station 104 using a Tx sector (e.g., the example Tx sector 128) associated with the example BF link 128 to a Rx sector (e.g., the example Rx sector 122) associated with the example BF link 128. Alternatively, the SRC BF determiner 106 may run CCAs on all example BF links 126, 128, 130 simultaneously. In some examples, the SRC BF determiner 106 transmits an ID for the example BF link 128 and/or the example Tx sector 114 associated with the BF link 128 with the RTS. Additionally, the SRC BF determiner 106 may transmit the BF link strength ranking with the RTS.

When the example DST station 104 receives a RTS through the example Rx sector 122 associated with the example BF link 128. The example DST BF determiner 108 runs a CCA for the Rx sector 122 associated with the BF link 128 that received the RTS. In some examples, the example DST BF determiner 108 runs a CCA for the BF link 128 based on the BF link ID and/or the example Tx sector ID. If the example BF link 128 is idle, the example DST BF determiner 108 transmits a CTS using the Rx sector associated with the example BF link 128 (e.g., the example Rx sector 122). If the example BF link 128 is busy, the example DST BF determiner 108 analyzes the signal strength ranking included in the RTS to determine the next strongest BF link (e.g., the example BF link 130) and run a CCA on the next strongest BF link. If the next strongest BF link is idle, the example DST station 104 transmits a CTS using the Rx sector associated with next strongest BF link (e.g., the example Rx sector 124). Alternatively, the DST BF determiner 108 may analyze the signal strength ranking included in the RTS, send CCA to each BF link 126, 128, 130 simultaneously, and send a CTS using the Rx sector associated with the strongest idle BF link. In some examples, the example CTS includes an ID associated with the selected BF link (e.g., the example BF link 128) and/or an ID associated with the selected Rx sector (e.g., the example Rx sector 122).

Once the example SRC station 102 receives the example CTS through the example Tx sector 114, the SRC BF determiner 106 establishes a connection using the example BF link 128 associated with the example Tx sector 114 that received the CTS and transmits transmission data using the example BF link 128. The example SRC BF determiner 106 selects the example BF link 128 based on the Tx sector that received the CTS and/or the BF link ID and/or the Rx link ID included in the CTS.

Figure 2:
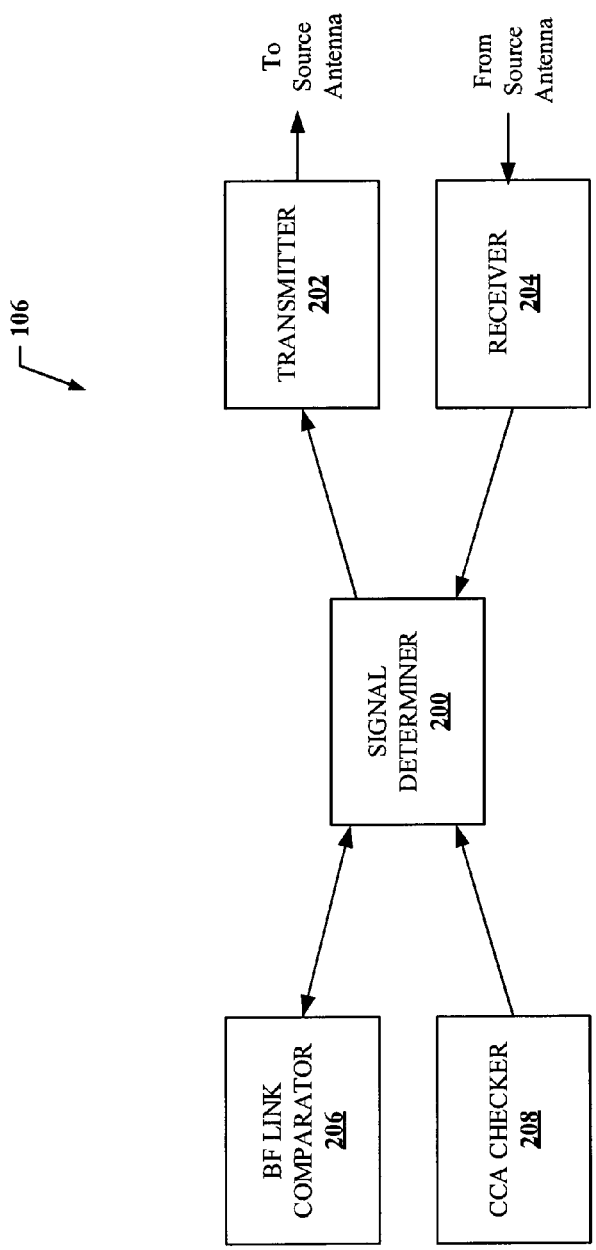
FIG. 2 is an example block diagram of an example source beamform determiner of FIG. 1.

FIG. 2 is a block diagram of an example implementation of the SRC BF determiner 106 of FIG. 1, disclosed herein, to determine facilitate communications between the example SRC station 102 and the example DST station 104. While the example SRC BF determiner 106 of FIG. 1 is described in conjunction with the example SRC station 102 and the example DST station 104, the example SRC BF determiner 106 may be utilized to facilitate communication using any device producing and/or receiving an electromagnetic signal. The example SRC BF determiner 106 includes an example signal determiner 200, an example transmitter 202, an example receiver 204, an example BF link comparator 206, and an example CCA checker 208.

The example signal determiner 200 processes and analyzes data from incoming signals and generates data to be transmitted as outgoing signals. The example signal determiner 200 creates the transmission packets to send to the example DST station 104. Additionally, the example signal determiner 200 selects, based on the BF link strength ranking, an optimal BF link and/or an optimal Tx sector to transmit an RTS. If the optimal (e.g., strongest) BF link and/or Tx sector is busy (e.g., based on a CCA), the example signal determiner 200 selects, based on the BF link strength ranking, the next best (e.g., the next strongest) BF link and/or Tx sector that is idle to transmit an RTS. In some examples, the example signal determiner 200 selects the example BF link 126, 128, 130 and/or the example Tx sector 112, 114, 116 to transmit transmission data to the example DST station 104 based on data associated with a received CTS.

The example transmitter 202 transmits data using one or more of the example Tx sectors 112, 114, 116. In some examples, the example transmitter 202 transmits transmissions packets to the example DST station 104. Additionally, the example transmitter 202 may transmits one or more RTSs to the example DST station 104. Additionally, the example transmitter 202 may transmit transmission data to the example DST station 104 after a correction has been established. In some examples, the transmitter 202 may include additional data (e.g., identifiers, communication protocols, error messages, BF link strength rankings, etc.) in the transmission packets and/or the RTS.

The example receiver 204 receives signals sent to one or more of the example Tx sectors 112, 114, 116. In some examples, the example receiver 204 receives response packets from the example DST station 104. Additionally, the example receiver 204 may receive CTSs from the example DST station 104. In some examples, the receiver 204 determines additional information (e.g., identifiers, communication protocols, error messages, etc.) from the response packets and/or the CTSs.

The example BF link comparator 206 determines the strength of the example BF links 126, 128, 130 based on the response packets. The BF link comparator 206 may determine the strength of the example BF links 126, 128, 130 based on determining a SNR associated with the response packets, determining an RSSI associated with the response packets, and/or using any other method to determine the strength of a signal. In some examples, the BF link comparator 206 compares the strength of each of the example BF links 126, 128, 130 to a threshold strength. In such examples, if the strength of a particular BF link is below the threshold strength, the BF link comparator 206 determines that the particular BF link is not strong enough to submit data and the particular BF link is ignored. In the example environment 100 of FIG. 1, the example BF links 126, 128, 130 are above the threshold strength. In some examples, the BF link comparator 206 orders (e.g., ranks) the example BF links 126, 128, 130 based on signal strength. For example, if the example BF link 128 is the strongest, the example BF link 130 is the next strongest link, and the example BF link 126 is the least strongest link, then the example BF link comparator 206 ranks the example BF link 128 first, the example BF link 130 second, and the example BF link 126 third. Additionally or alternatively, since each of the example BF links 126, 128, 130 are associated with a particular Tx sector (e.g., the example BF link 126 is associated with the example Tx sector 112, the example BF link 128 is associated with Tx sector 114, and the example BF link 130 is associated with Tx sector 116), the example BF link comparator 206 may rank the strengths based on the example Tx sectors 112, 114, 116.

The example CCA checker 208 determines whether one or more of the example BF links 126, 128, 130 is busy or idle. As previously described, if one of the example BF links 126, 128, 130 is busy, then the BF link 126, 128, 130 cannot be used to establish a connection for data transmission. A CCA is a physical carrier sense which obtains received energy from a signal. A CCA determines that a BF link is busy when another signal (e.g., Wi-Fi signal) preamble is detected. In some examples, the CCA decodes a Physical Layer Convergence Protocol (PLCP) header of a signal to determine whether the signal is busy for an amount of time required for data transmission to occur. In some examples, the CCA checker 208 determines the status of each of the BF links 126, 128, 130 simultaneously. Alternatively, the CCA checker 208 determines the status of the strongest BF link and only checks subsequent BF links if the strongest BF link is busy.

Figure 3:
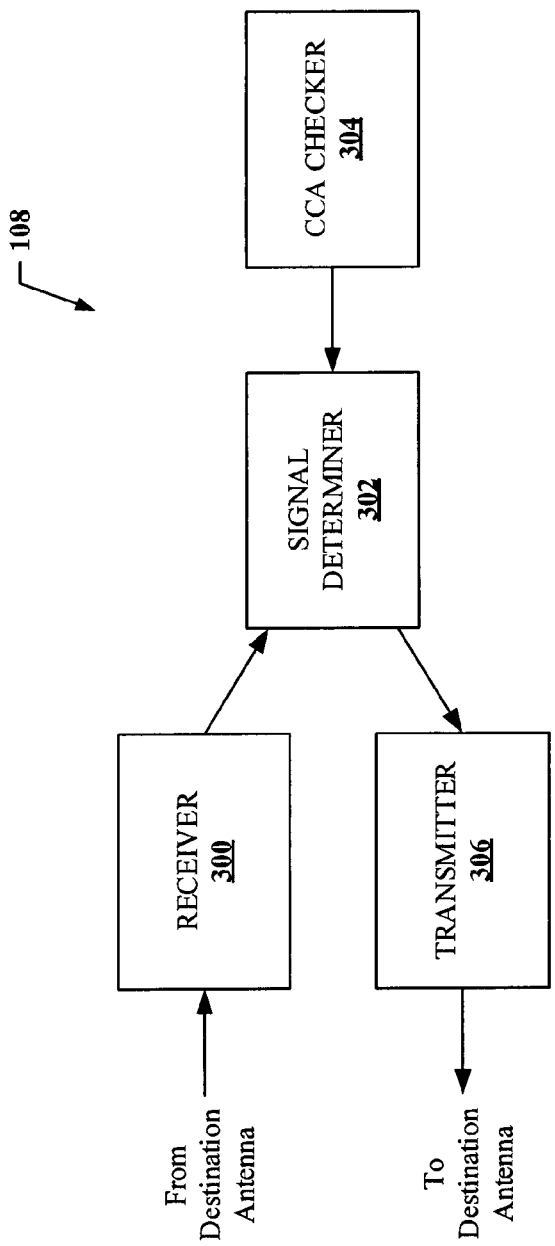
FIG. 3 is an example block diagram of an example destination beamform determiner of FIG. 1.

FIG. 3 is a block diagram of an example implementation of the DST BF determiner 108 of FIG. 1, disclosed herein, to facilitate communications between the example SRC station 102 and the example DST station 104. While the example DST BF determiner 108 of FIG. 1 is described in conjunction with the example SRC station 102 and the example DST station 104, the example DST BF determiner 108 may be utilized to facilitate communication any device producing and/or receiving an electromagnetic signal. The example SRC BF determiner 106 includes an example receiver 300, an example signal determiner 302, an example CCA checker 304, and an example transmitter 306.

The example receiver 300 receives signals sent to one or more of the example Rx sectors 120, 122, 124. The example receiver 300 receives transmission packets from the example SRC station 102. Additionally, the example receiver receives RTS(s) from the example SRC station 102. Additionally, the example receiver 300 receives data from the example SRC station 102. In some examples, the receiver 300 determines additional information (e.g., identifiers, communication protocols, error messages, etc.) from the transmission packets.

The example signal determiner 302 analyzes data from incoming signals and generates data to be transmitted as outgoing signals. In response to receiving transmission packets, the example signal determiner 302 creates response packets to send to the example SRC station 102. In some examples, when a received RTS includes a BF strength ranking, the example signal determiner 302 selects, based on a BF link strength ranking, an optimal (e.g., strongest) BF link and/or an optimal Rx sector to transmit a CTS. If the optimal BF link and/or Rx sector is busy (e.g., based on a CCA), the example signal determiner 302 selects, based on the BF link strength ranking, the next strongest BF link and/or Rx sector that is idle to transmit an RTS.

The example CCA checker 304 determines whether one or more of the example BF links 126, 128, 130 is busy or idle. As previously described, if one of the example BF links 126, 128, 130 is busy, then the BF link 126, 128, 130 cannot be used for data transmission. In some examples, the CCA checker 304 determines the status of each of the BF links 126, 128, 130 simultaneously. Alternatively, the CCA checker 304 determines the status of the optimal BF link and only checks subsequent BF links if the optimal BF link is busy.

The example transmitter 306 transmits data through one or more of the example Rx sectors 120, 122, 124. In response to receiving transmission packets, the example transmitter 306 transmits response packets to the example SRC station 102. Additionally, in response to receiving RTSs from the example SRC station 102, the example transmitter 306 transmits one or more CTSs to the example SRC station 102. In some examples, the transmitter 306 may include additional data (e.g., identifiers, communication protocols, error messages, etc.) in the response packets and/or the CTS.

Figure 4:
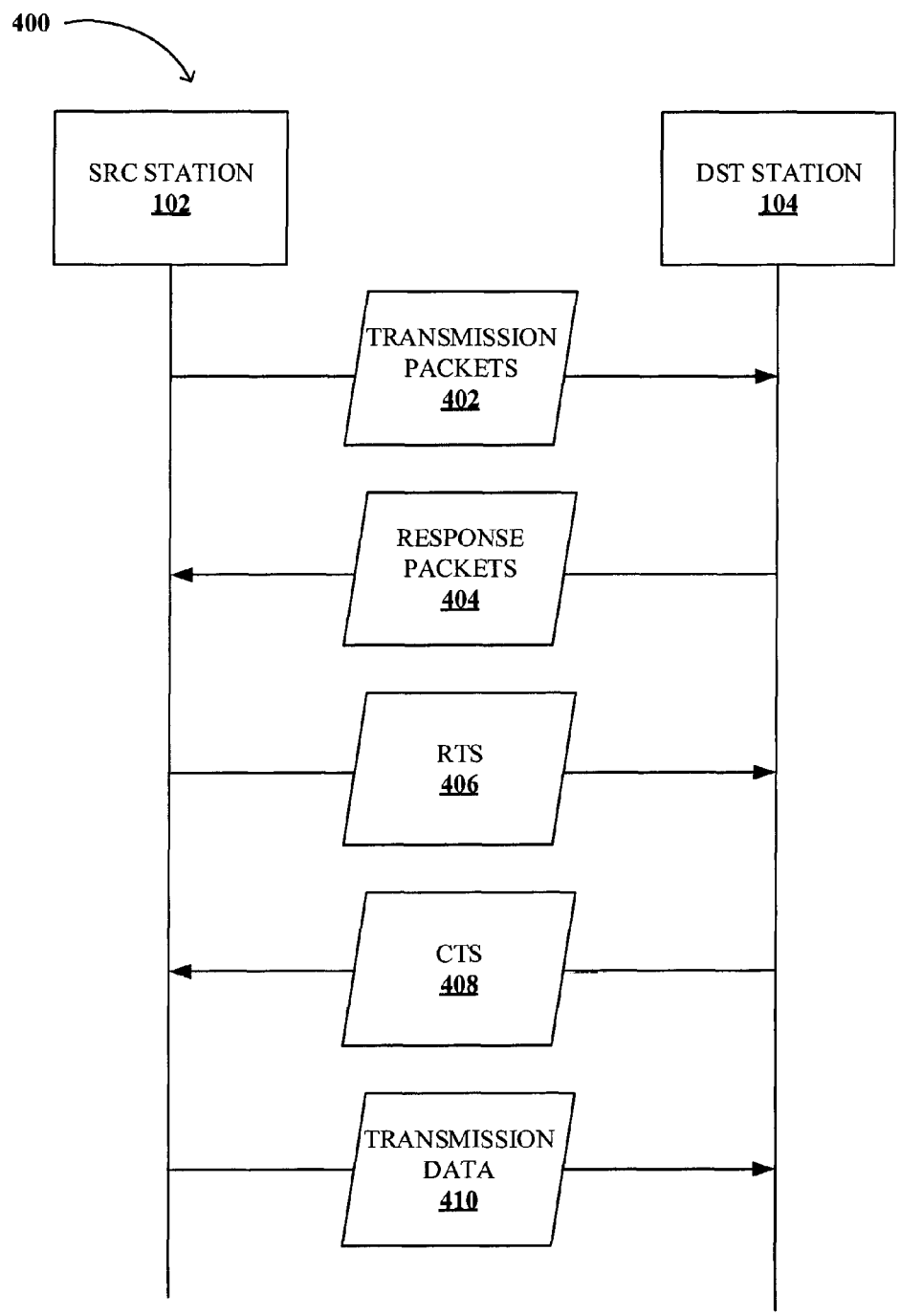
FIG. 4 is a communication diagram representative of an example communication between the example source station and the example destination station of FIG. 1.

FIG. 4 is an example communications diagram 400 representative of an example communication between the example SRC station 102 and the example DST station 104. As previously described, the example SRC station 102 determines a BF link ranking based on the strength of the example BF links 126, 128, 130. The example SRC station 102 transmits an RTS based on the BF link ranking and CCA. Once the example SRC station 102 receives a CTS, the SRC station 102 establishes a connection to transmit data to the example DST station 104. The example communications diagram includes example transmission packets 402, example response packets 404, an example RTS 406, an example CTS 406, and example data.

Initially, the example SRC station 102 sends the example transmission packets 402 to the example DST station 104 using all available BF links. The example Rx sectors 120, 122, 124 of the example DST station 104 receive the transmission packets. In some examples, some of the transmission packets may not be received by one of the example Rx sectors 120, 122, 124 (e.g., such as when the example BF link 132 is blocked and/or the example BF link 132 associated with the example Tx sectors does not align with one of the example Rx sectors). In response to receiving the example transmission packets 402, the DST station 104 sends the example response packets 404 using the same Rx sectors that received a transmission packet.

The example SRC station 102 receives the response packets 404 and determines the strength of each BF link 126, 128, 130 based on the response packet signals. The example SRC station 102 ranks the BF links based on the strength, as further described in FIG. 5. Based on the ranking and CCA, the example SRC station transmits the example RTS 406 using a strongest idle BF link. In some examples, the SRC station includes an identifier and/or the BF link ranking with and/or embedded in the example RTS 406.

The example DST station 104 receives the example RTS 406. If the RTS 406 includes additional information, the DST station 104 will analyze the information to help determine which BF link to transmit the example response CTS 408, as further described in FIG. 6. In response to receiving the RTS 406, the DST station 104 sends the CTS 408 to the example SRC station 102 using a strongest idle BF link.

The example SRC station 102 receives the example CTS 408 from the example DST station 104. The SRC station 102 selects that BF link associated with received CTS 408 and establishes a connection to transmit the example transmission data 410 to the DST station 104 using the selected BF link. The DST station 104 receives the example transmission data 410 from the selected BF link.

While example manners of implementing the example SRC BF determiner 106 and the DST BF determiner 108 of FIG. 1 are illustrated in FIGS. 2 and 3, elements, processes and/or devices illustrated in FIGS. 2 and 3 may be combined, divided, re-arranged, omitted, eliminated and/or implemented in any other way. Further, the example signal determiner 200, the example transmitter 202, the example receiver 204, the example BF link comparator 206, the example CCA checker 208 and/or, more generally, the example SRC BF determiner 106 of FIG. 2, and/or the example receiver 300, the example signal determiner 302, the example CCA checker 304, the example transmitter 306, and/or more generally, the example DST BF determiner 108 of FIG. 3 may be implemented by hardware, machine readable instructions, software, firmware and/or any combination of hardware, machine readable instructions, software and/or firmware. Thus, for example, any of the example signal determiner 200, the example transmitter 202, the example receiver 204, the example BF link comparator 206, the example CCA checker 208 and/or, more generally, the example SRC BF determiner 106 of FIG. 2, and/or the example receiver 300, the example signal determiner 302, the example CCA checker 304, the example transmitter 306, and/or more generally, the example DST BF determiner 108 of FIG. 3, could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example signal determiner 200, the example transmitter 202, the example receiver 204, the example BF link comparator 206, the example CCA checker 208 and/or, more generally, the example SRC BF determiner 106 of FIG. 2, and/or the example receiver 300, the example signal determiner 302, the example CCA checker 304, the example transmitter 306, and/or more generally, the example DST BF determiner 108 of FIG. 3, is/are hereby expressly defined to include a tangible computer readable storage device or storage disk such as a memory, a digital versatile disk (DVD), a compact disk (CD), a Blu-ray disk, etc. storing the software and/or firmware. Further still, the example SRC BF determiner 106 of FIG. 2 and/or the example DST BF determiner 106 of FIG. 3 includes elements, processes and/or devices in addition to, or instead of, those illustrated in FIGS. 5 and 6, and/or may include more than one of any or all of the illustrated elements, processes and devices.

Figure 5:
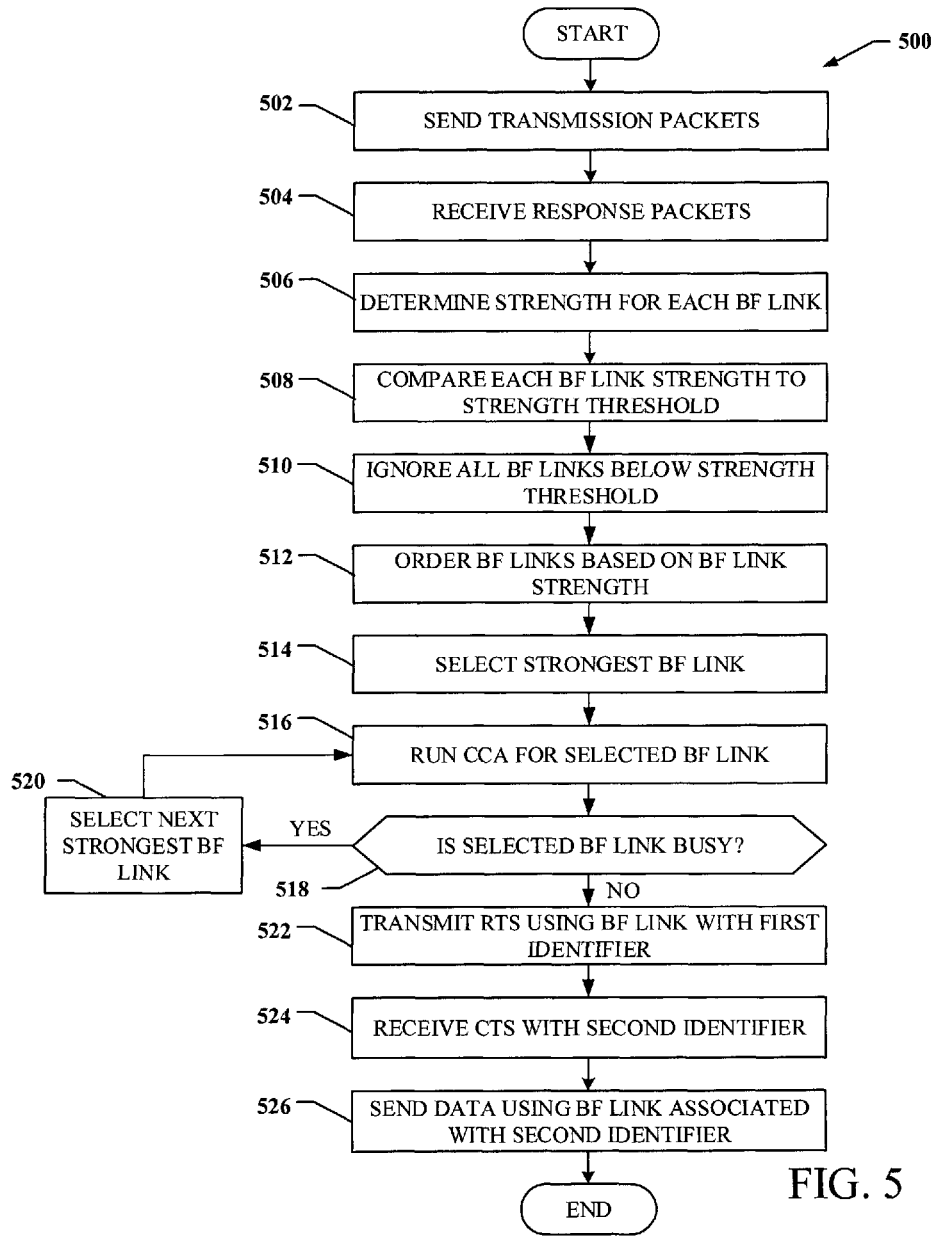
FIG. 5 is a flowchart representative of example machine readable instructions that may be executed to implement the example source beamform determiner of FIG. 2.
Figure 6:
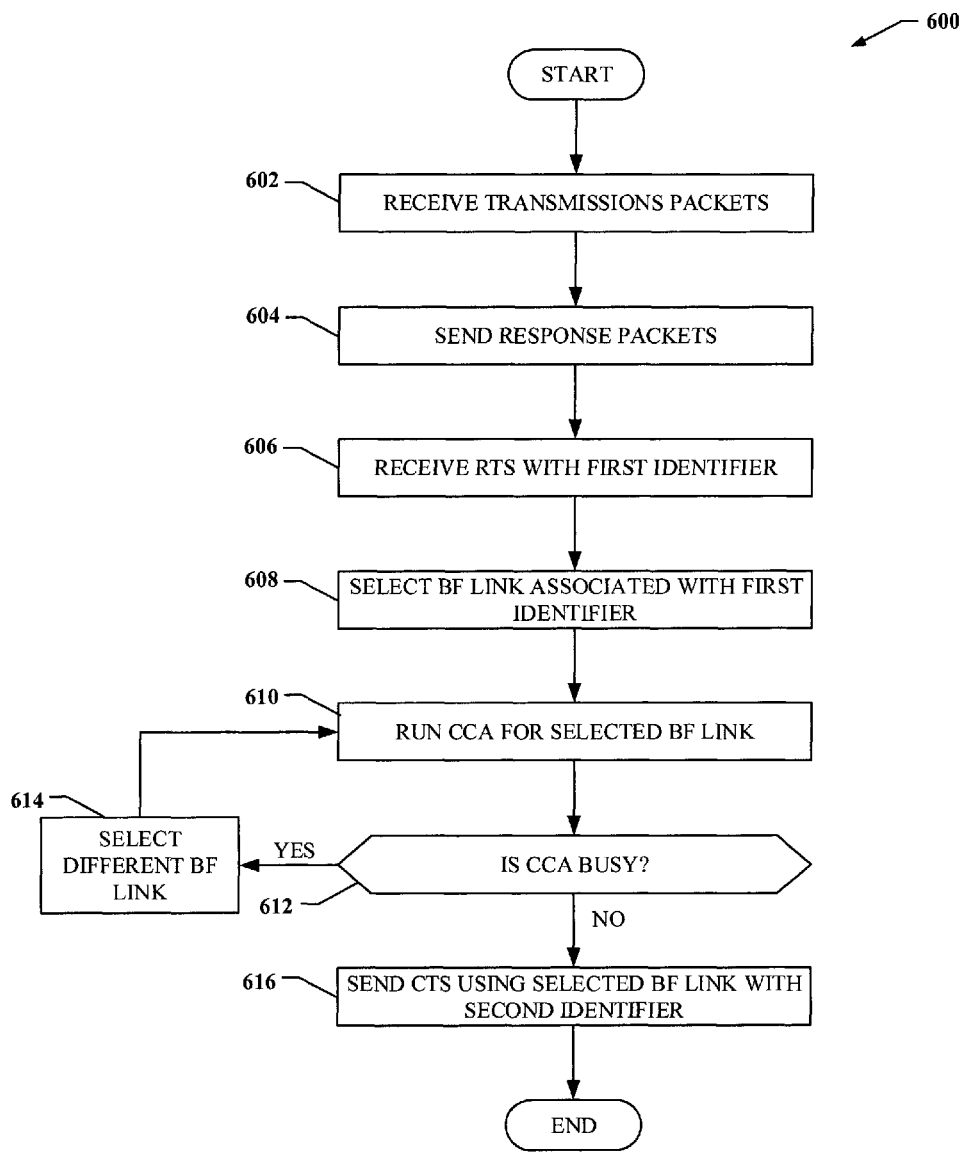
FIG. 6 is a flowchart representative of example machine readable instructions that may be executed to implement the example destination beamform determiner of FIG. 3.

A flowchart representative of example machine readable instructions for implementing the example SRC BF determiner 106 of FIG. 2 and/or the example DST BF determiner 106 of FIG. 3 is shown in FIGS. 5 and 6. In the examples, the machine readable instructions comprise a program for execution by a processor such as the processors 812, 912 shown in the example processor platforms 800, 900 discussed below in connection with FIGS. 8 and 9. The program may be embodied in machine readable instructions stored on a tangible computer readable storage medium such as a CD-ROM, a floppy disk, a hard drive, a digital versatile disk (DVD), a Blu-ray disk, or a memory associated with the processors 812, 912, but the entire program and/or parts thereof could alternatively be executed by a device other than the processors 812, 912 and/or embodied in firmware or dedicated hardware. Further, although the example program is described with reference to the flowchart illustrated in FIGS. 5 and 6, many other methods of implementing the example SRC BF determiner 106 of FIG. 2 and/or the example DST BF determiner 106 of FIG. 3 may alternatively be used. For example, the order of execution of the blocks may be changed, and/or some of the blocks described may be changed, eliminated, or combined.

As mentioned above, the example processes of FIGS. 5 and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5 and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 is an example flowchart 500 representative of example machine readable instructions that may be executed by the example SRC BF determiner 106 to determine which of the example BF links 126, 128, 130 should be utilized to establish a connection to transmit data to the example DST station 104.

At block 502, the example transmitter 202 sends transmission packets though each of the example Tx sectors 112, 114, 116 in the example SRC antenna 110. If a transmission packet sent from a particular Tx sector is received by a particular Rx sector in a DST station (e.g. the example DST station 104), the connection is defined as a BF link. In some examples, not all transmission packets are received by the DST station 104. For example, the example SRC antenna 110 includes five Tx sectors, but only the example Tx sectors 112, 114, 116 form BF links (e.g., the example BF links 126, 128, 130). In some examples, the transmission packets include identifiers associated with the Tx sectors 112, 114, 116 and/or the BF links 126, 128, 130.

At block 504, the example receiver 204 receives response packets based on the received transmission packets. The example signal determiner 200 determines which of the example BF links 126, 128, 130 are functional (e.g., which of the example Tx sector 112, 114, 116 received a response packet). In some examples, the response packets may include an Rx sector ID. In such examples, the signal determiner 200 may correlate the Tx sector, the Rx sector, and/or the BF link between the Tx sector and the Rx sector.

At block 506, the example BF link comparator 206 determines a strength (e.g., signal strength) of the example BF links 126, 128, 130 based on the response packets. As previously described, the BF link comparator 206 may determine the strength of the example BF links 126, 128, 130 based on a SNR associated with the response packets, an RSSI associated with the response packets, and/or any other method of determining signal strength.

At block 508, the example BF link comparator 206 compares the strength of each BF link 126, 128, 130 to a strength threshold. The strength threshold may be based on user and/or manufacture preferences. In some examples, the strength threshold is based on the amount of strength needed to accurately transmit data. The example BF link comparator 206 ignores (e.g., omits) all BF links that are below the strength threshold (block 510). At block 512, the example BF link comparator 206 orders (e.g., ranks) the remaining example BF links 126, 128, 130 based on signal strength. In some examples, the ranking includes the example Tx sectors 112, 114, 116 and/or the Rx sectors 120, 122, 124 associated with the example BF links 126, 128, 130.

At block 514, the example signal determiner 200 selects the strongest (e.g., highest ranked) BF link (e.g., the example BF link 128). Once the example BF link 128 has been selected, the example CCA checker 208 runs a CCA for the selected BF link 128 (block 516). As previously described, the CCA determines whether the BF link 128 is busy or idle. At block 518, the example CCA checker 208 determines if the selected BF link 128 is busy. If the selected BF link 128 is busy, the example signal determiner 200 selects the next strongest BF link (e.g., the example BF link 130) (block 520). The example CCA checker 208 continues to run CCAs to determine an idle BF link. In some examples, if none of the example BF links 126, 128, 120 are idle, the CCA checker 208 re-may check each of the example links 126, 128, 130. Alternatively, if none of the example BF links 126, 128, 130 are idle, the CCA checker 208 may stop and/or flag the transmission. If the selected BF link 128 is not busy, the example transmitter 202 transmits an RTS (block 522). In some examples, the example transmitter 202 includes a first identifier with and/or embedded in the RTS. In such examples, the first identifier may be a BF link ID, a Tx sector ID, a Rx sector ID, and/or a correlation between the BF link ID, the Tx sector ID, and/or the Rx sector ID. Additionally, the example transmitter 202 may include data associated with the strength ranking of example BF links 126, 128, 130.

At block 524, the example receiver 204 receives a CTS from one of the example Tx sectors 112, 114, 116. In some examples, the CTS includes a second identifier (e.g., a BF link ID, a Tx sector ID, a Rx sector ID, etc.) which is identified by the example receiver 204. In some examples, the second identifier is the same as the first identifier. Alternatively, the second identifier may be different from the first identifier (e.g., when the CTS was received from a different BF link than the BF link used to send the RTS). In some examples, the example signal determiner 200 selects the BF link that will be utilized for data transmission based on the BF link associated with the second identifier. Alternatively, the example signal determiner 200 may select the BF link that will be utilized for data transmission based on the BF link associated with Tx sector that received the CTS. At block 526, the example transmitter 202 establishes a connection to transmit transmission data using the selected BF link.

FIG. 6 is an example flowchart 600 representative of example machine readable instructions that may be executed by the example DST BF determiner 108 to determine which of the example BF links 126, 128, 130 are utilized to establish a connection to receive data to the example DST station 104.

At block 602, the example receiver 300 receives transmission packets from the example Rx section 120, 122, 124 from the example DST antenna 118. In some examples, some of the example Rx sector 120, 122, 124 may not receive a transmission packet. For example, if the all of the paths from the signals transmitted from the Tx sectors do not align with a particular Rx sector, the Rx sector will not receive a transmission packet. In some examples, each transmission packet may include an identifier associated with the BF link and/or the Tx sector associated with the transmission packet. In such examples, the example receiver 300 identifies the identifier from the transmission packet. Additionally, the transmission packet may include a BF link strength ranking. In such examples, the example receiver 300 determines the BF link strength ranking from the transmission packet. The data related to the transmission packet is further processed by the example signal determiner 302.

At block 604, the example transmitter 306 transmits response packets using the example Rx sectors (e.g. the example Rx sector 120, 122,124) that received a transmission packet. In some examples, the example transmitter 306 includes a Rx sector ID in the response packet. Additionally, the example transmitter 206 may include the received Tx sector ID, the BF link ID, and/or any other data associated with the transmission packet and/or response packet.

At block 606, the example receiver 300 receives an RTS in an Rx sector (e.g., the example Rx sector 122). In some examples, the RTS includes data such as a first ID (e.g., the example BF link 128 ID and/or the example Tx sector 114 ID) and/or the BF link ranking. In such examples, the example receiver 300 determines the data and the example signal determiner 302 receives the data for further processing.

At block 608, the example signal determiner 302 selects the BF link associated with the first ID (e.g., the example BF link 128). In some examples, the example signal determiner 302 first determines whether the selected BF link is the strongest BF link, based on the BF link ranking. In such examples, if the selected BF link is not the strongest BF link, the example signal determiner 302 may select the strongest BF link. For example, if the example SRC station 102 transmits an RTS with the second strongest BF link (e.g., because the first strongest BF link was busy), the first strongest BF link may be idle by the time the example signal determiner 302 is ready to send a CTS. In such an example, the signal determiner 302 uses the strongest BF link to send the CTS (e.g., since the strongest BF link is no longer busy).

Once the example BF link 128 has been selected, the example CCA checker 304 runs a CCA for the selected BF link 128 (block 610). As previously described, the CCA determines whether the BF link 128 is busy or idle. At block 612, the example CCA checker 304 determines if the selected BF link 128 is busy. If the selected BF link 128 is busy, the example signal determiner 200 selects the next strongest BF link (e.g., the example BF link 130) (block 614). The example CCA checker 304 continues to run CCAs to determine an idle BF link. In some examples, if none of the example BF links 126, 128, 120 are idle, the CCA checker 304 re-may check each of the example links 126, 128, 130. Alternatively, if none of the example BF links 126, 128, 130 are idle, the CCA checker 304 may stop and/or flag the transmission. If the selected BF link 128 is not busy, the example transmitter 306 transmits a CTS using the selected BF link (e.g., the example BF link 128) (block 616). In some examples, the example transmitter 306 includes a second identifier with and/or embedded in the CTS. In such examples, the second identifier may be a BF link ID, a Tx sector ID, a Rx sector ID, and/or a correlation between the BF link ID, the Tx sector ID, and/or the Rx sector ID. If the selected BF link (e.g., the example BF link 128) used to transmit the CTS is the same BF link used when the RTS was received, the second identifier will be the same as the first identifier; otherwise, the second identifier will be different than the first identifier.

Figure 7A:
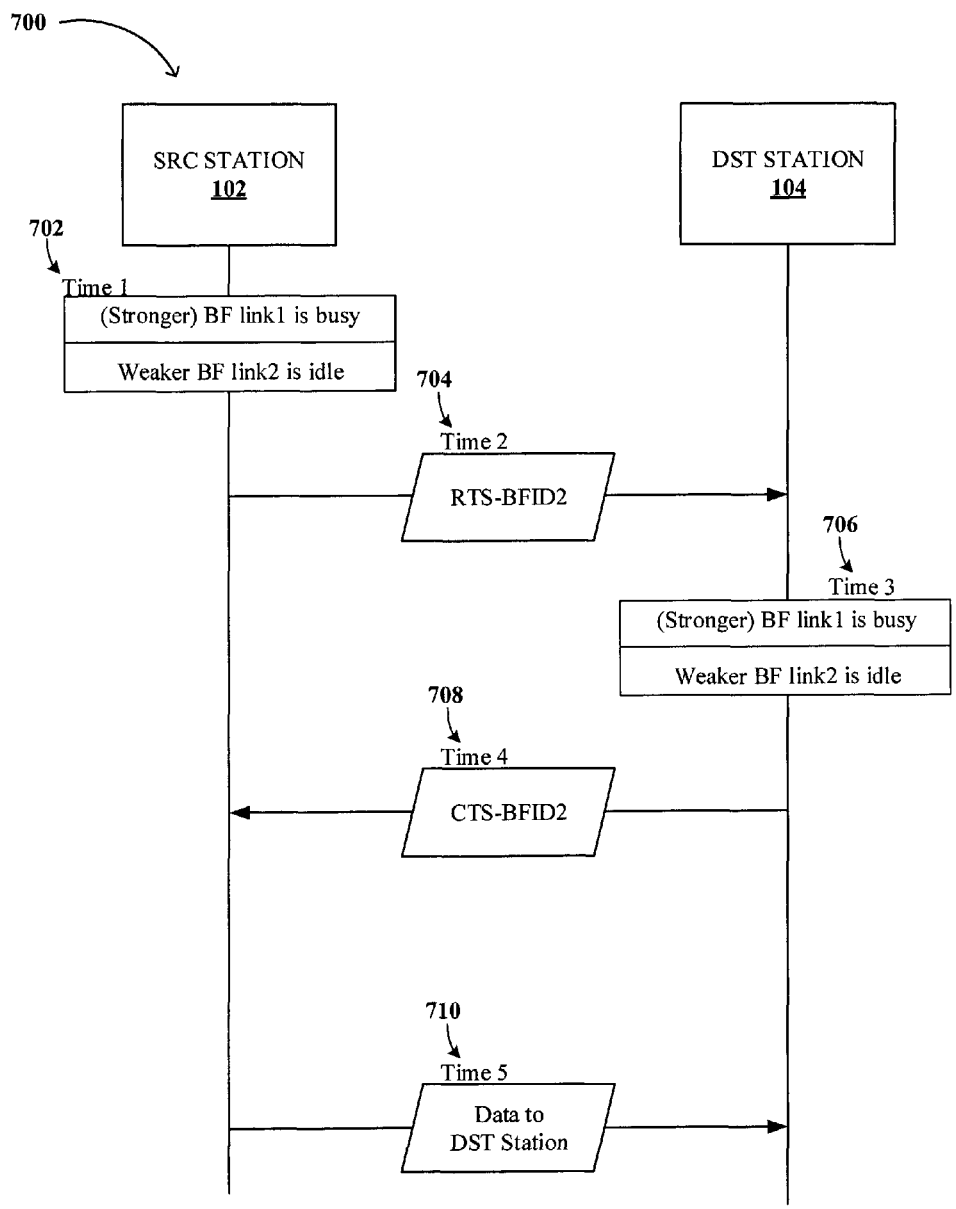
FIGS. 7A and 7B are example timing diagrams based on data communicated between the source station and the example destination station of FIG. 1.
Figure 7B:
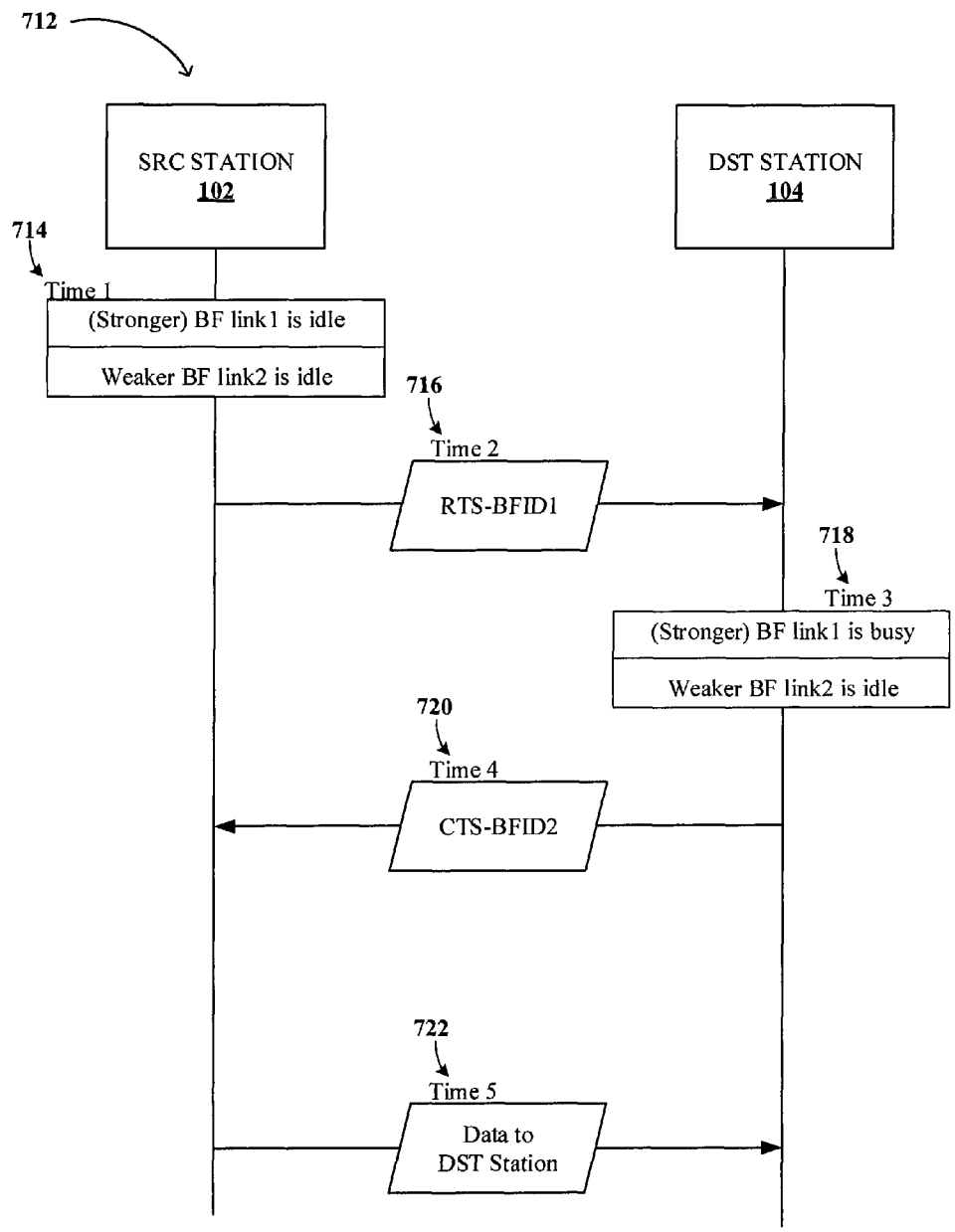

FIGS. 7A and 7B are example timing diagrams 700, 712 that illustrate two examples of communications between the example SRC station 102 and the example DST station 104 to determine the optimal BF link for data transmission. The illustrated example timing diagram 700 of FIG. 7A includes the example SRC station 102 and the example DST station 104. In the illustrated example timing diagram 700, there are only two BF links (e.g., the stronger BF link1 and the weaker BF link2). The other BF links (e.g., the example BF links 132, 136) may not exist or may be below the threshold strength. The illustrated example timing diagram 700 includes an example time1 702, an example time2 704, an example time3 706, an example time4 708, and an example time5 710.

At time1 702, the example SRC station 102 runs a CCA check for BF link1 and BF link2. In some examples, the example SRC station 102 runs a first CCA check for BF link1 and subsequently runs a second CCA check for BF link2 only if BF link1 is busy. At time2 704, since the stronger BF link1 is busy and the weaker BF link2 is idle, the example SCR station 102 sends an RTS using the weaker BF link2 with an ID associated with the BF link2.

At time3 706, the example DST station 104 receives the RTS and runs a CCA for BF link1 and BF link2. In some examples, the RST includes the BF link ranking. In such examples, the DST station 104 may determine that since BF link2 is weaker and will run a CCA check on the stronger BF link1 to determine if the BF link1 is now idle. Additionally, the DST station 104 runs a CCA on the BF link2 to verify that the BF link2 is still idle.

At time4 708, the example DST station 104 determines that BF link1 is still busy and BF link2 is still idle, and transmits a CTS to the example SRC station 102 using the BF link2 with the ID associated with the BF link2. At time5 710, the example SRC station 102 receives a CTS through BF link2 with the BF link1 ID and establishes a connection and begins data transmission to the DST station 104 using the BF link2.

The illustrated example timing diagram 712 of FIG. 7B includes the example SRC station 102 and the example DST station 104. In the illustrated example timing diagram 712, there are only two BF links (e.g., the stronger BF link1 and the weaker BF link2). The other BF links (e.g., the example BF links 132, 136) may not exist or may be below the threshold strength. The illustrated example timing diagram 712 includes an example time1 714, an example time2 716, an example time3 718, an example time4 720, and an example time5 722.

At time1 714, the example SRC station 102 runs a CCA check for BF link1 and BF link2. In some examples, the example SRC station 102 runs a first CCA check for BF link1 and subsequently runs a second CCA check for BF link2 only if BF link1 is busy. At time2 716, since both BF link1 and BF link2 are idle, the example SCR station 102 sends an RTS using the stronger BF link1 with an ID associated with the BF link1.

At time3 718, the example DST station 104 receives the RTS and runs a CCA for BF link1 and BF link2. The DST station 104 runs a CCA on the BF link1 to verify that the BF link1 is still idle. Additionally, the DST station 104 runs a CCA on the BF link2 to determine if BF link2 is idle in case BF link1 is busy. Alternatively, the DST station 104 may run a CCA only if the CCA for BF link1 determines that BF link1 is busy.

At time4 720, the example DST station 104 determines that BF link1 is now busy and BF link2 is still idle, and transmits a CTS to the example SRC station 102 using the weaker BF link2 with the ID associated with the BF link2. At time5 722, the example SRC station 102 receives a CTS through BF link2 with the BF link2 ID and establishes a connection and begins data transmission to the DST station 104 using the BF link2.

Figure 8:
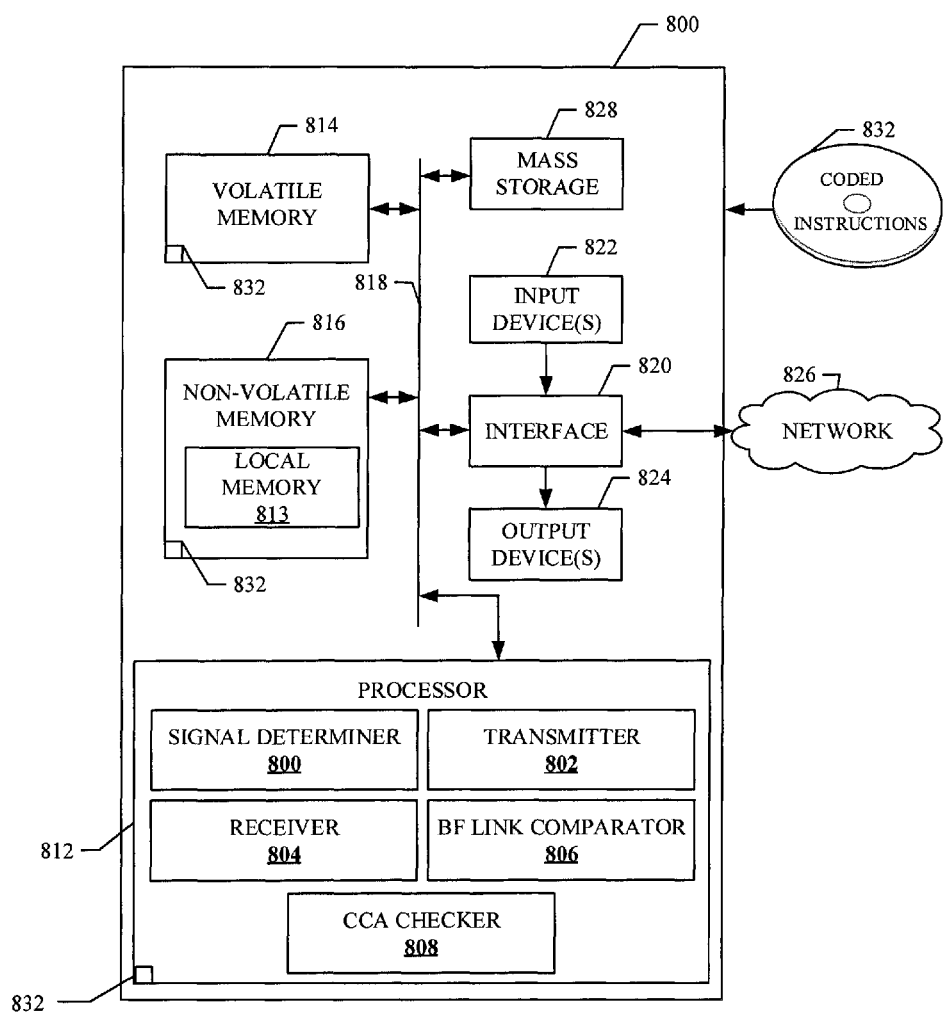
FIG. 8 is a block diagram of a processor platform structured to execute the example machine readable instructions of FIG. 5 to implement the example source beamform determiner of FIG. 2.

FIG. 8 is a block diagram of an example processor platform 800 capable of executing the instructions of FIG. 5 to implement the example SRC BF determiner 106 of FIGS. 1 and 2. The processor platform 800 can be, for example, a server, a personal computer, a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by integrated circuits, logic circuits, microprocessors or controllers from any desired family or manufacturer.

The processor 812 of the illustrated example includes a local memory 813 (e.g., a cache). The example processor 812 of FIG. 8 executes the instructions of FIG. 5 to implement the example signal determiner 200, the example transmitter 202, the example receiver 204, the example BF link comparator 206, and the example checker 208 of FIG. 2 to implement the example SRC BF determiner 106. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a clock controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIG. 3 may be stored in the mass storage device 828, in the volatile memory 814, in the non-volatile memory 816, and/or on a removable tangible computer readable storage medium such as a CD or DVD.

Figure 9:
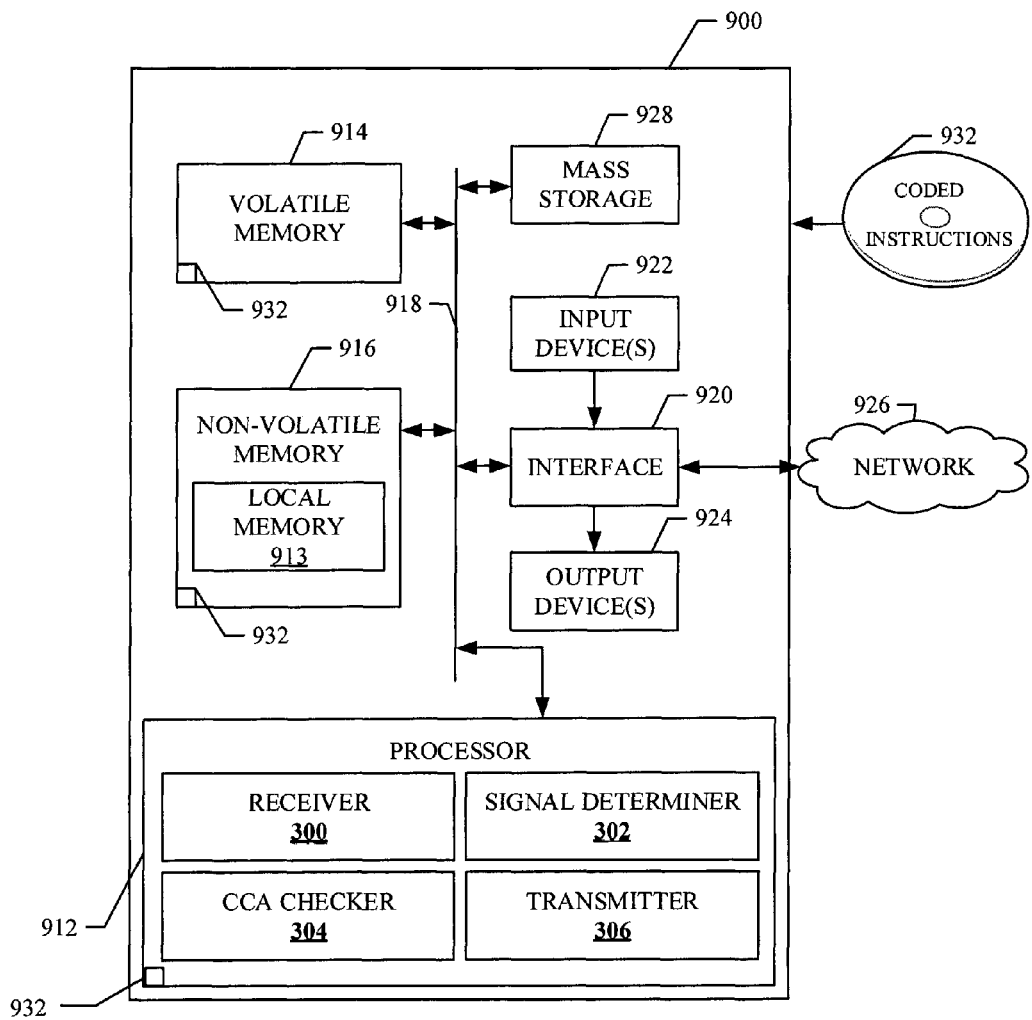
FIG. 9 is a block diagram of a processor platform structured to execute the example machine readable instructions of FIG. 9 to implement the example destination beamform determiner of FIG. 3.

FIG. 9 is a block diagram of an example processor platform 900 capable of executing the instructions of FIG. 6 to implement the example DST BF determiner 104 of FIGS. 1 and 3. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by integrated circuits, logic circuits, microprocessors or controllers from any desired family or manufacturer.

The processor 912 of the illustrated example includes a local memory 913 (e.g., a cache). The example processor 912 of FIG. 9 executes the instructions of FIG. 6 to implement the example receiver 300, the example signal determiner 302, the example CCA checker 304, and the example transmitter 306 of FIG. 3 to implement the example DST BF determiner 108. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a clock controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIG. 3 may be stored in the mass storage device 928, in the volatile memory 914, in the non-volatile memory 916, and/or on a removable tangible computer readable storage medium such as a CD or DVD.

From the foregoing, it would be appreciated that the above disclosed method, apparatus, and articles of manufacture facilitate wireless beamform data transmission between a source station and a destination station. Using the examples disclosed herein, weaker beamform links between the source station and the destination station can be utilized when the strongest beamform link is busy and/or currently unavailable to establish a connection between the source station and the destination station.

Conventional techniques for beamforming include determining the strongest beamform link between a source station and a destination station and only attempting to transmit data using the strongest beamform link. Such conventional techniques terminate data transmission when the strongest beamform link is busy; therefore, wireless communication between the source station and the destination station is not possible. Examples disclosed herein alleviate such problems by ranking the available beamform links between the source station and the destination station and transmitting data using a weaker idle beamform link when the stronger beamform link is busy.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

Example 1 is a method comprising determining strengths of a first wireless link between a first transmission sector and a first receiver sector and a second wireless link between a second transmission sector and a second receiver sector. Example 1 also includes determining whether the first and second wireless links is busy or idle. Example 1 also includes selecting an idle wireless link of the plurality of wireless links based on the strengths of the first and second wireless links that are idle. Example 1 also includes establishing a transmission connection with the selected idle wireless link.

Example 2 includes the subject matter of example 1, further including transmitting transmission packets to a plurality of receiver sectors, the plurality of receiver sectors including the first and second receiver sectors, receiving response packets from a subset of a plurality of receiver sectors, the plurality of receiver sectors including the first and second receiver sectors, wherein the determining of the strength of the first and second wireless links is based on at least one of a signal-to-noise ratio or a received signal strength indicator associated with the first and second wireless links Example 3 includes subject matter of example 2, wherein each of the transmission packets includes at least one of (A) a wireless link identifier associated with a transmission packet or (B) a transmission sector identifier associated with the transmission packet.

Example 4 includes subject matter of one of examples 1 or 2, further including ranking a plurality of wireless links based on the strengths, the plurality of wireless links including the first and second wireless links.

Example 5 includes subject matter of example 4, further including, when a strength of a wireless link of the plurality of wireless links is below a threshold strength, omitting the wireless link from the ranking.

Example 6 includes subject matter of example 5, wherein the determining of whether the first and second wireless links are busy or idle is based on a clear channel assessment.

Example 7 includes subject matter of example 1, further including determining whether a strongest wireless link of the first and second wireless links is busy or idle. Example 7 further includes when the strongest wireless link is idle, establishing a wireless link using the strongest wireless link, and when the strongest wireless link is busy, determining whether a next strongest wireless link of the plurality of wireless links is busy or idle.

Example 8 includes subject matter of example 7, wherein the establishing of the transmission connection includes transmitting data using the strongest idle wireless link.

Example 9 includes subject matter of example 1 or 7, wherein the establishing of the transmission connection further includes transmitting a request-to-send to a first strongest receiver sector associated with the strongest idle wireless link, and receiving a clear-to-send from a second strongest receiver sector, wherein the transmission connection is established using a second strongest wireless link associated with the second strongest receiver sector.

Example 10 includes subject matter of example 9, wherein the request-to-send includes at least one of a wireless link identifier associated with the request-to-send, a transmission sector identifier associated with the request-to-send, or a ranking based on the strengths.

Example 11 includes subject matter of example 9, wherein the first strongest receiver sector is the same as the second strongest receiver sector and the strongest idle wireless link is the second wireless link.

Example 12 includes subject matter of example 9, further including correlating the first wireless link with (A) the first transmission sector and (B) the first receiver sector, wherein the ranking includes the correlation.

Example 13 includes subject matter of claim 1, wherein the first and second wireless links are beamform links.

Example 14 is an apparatus comprising a beamform link comparator to determine strengths of a first wireless link between a first transmission sector and a first receiver sector and a second wireless link between a second transmission sector and a second receiver sector. Example 14 also comprises a clear channel assessment checker to determine whether the first and second wireless links is busy or idle. Example 14 also comprises a signal determiner to select an idle wireless link of the plurality of wireless links based on the strengths of the first and second wireless links that are idle. Example 14 also comprises a transmitter to establish a transmission connection with the selected idle wireless link.

Example 15 includes subject matter of example 14, further including a receiver, wherein the transmitter is to transmit transmission packets to a plurality of receiver sectors, the plurality of receiver sectors including the first and second receiver sectors, and the receiver is to receive response packets from a subset of a plurality of receiver sectors, the plurality of receiver sectors including the first and second receiver sectors, wherein the beamform link comparator is to determine of the strength of the first and second wireless links is based on at least one of a signal-to-noise ratio or a received signal strength indicator associated with the first and second wireless links.

Example 16 includes the subject matter of example 15, wherein each of the transmission packets includes at least one of (A) a wireless link identifier associated with a transmission packet or (B) a transmission sector identifier associated with the transmission packet.

Example 17 includes the subject matter of one of examples 14 or 15, wherein the beamform link comparator is to rank a plurality of wireless links based on the strengths, the plurality of wireless links including the first and second wireless links.

Example 18 includes the subject matter of example 17, wherein the beamform link comparator is to, when a strength of a wireless link of the plurality of wireless links is below a threshold strength, omit the wireless link from the ranking.

Example 19 includes the subject matter of example 14, wherein the clear channel assessment is to determine of whether the first and second wireless links are busy or idle is based on a clear channel assessment.

Example 20 includes subject matter of example 14, wherein the CCA checker is to determine whether a strongest wireless link of the first and second wireless links is busy or idle. Example 20 also includes the transmitter to when the strongest wireless link is idle, establishing a wireless link using the strongest wireless link, and when the strongest wireless link is busy, determining whether a next strongest wireless link of the plurality of wireless links is busy or idle.

Example 21 includes the subject matter of example 20, wherein the transmitter is to transmit data using the strongest idle wireless link.

Example 22 includes subject matter of one of examples 14 or 20, wherein the transmitter is to transmit a request-to-send to a first strongest receiver sector associated with the strongest idle wireless link, and the receiver is to receive a clear-to-send from a second strongest receiver sector, wherein the transmitter is establish transmission using a second strongest wireless link associated with the second strongest receiver sector.

Example 23 includes the subject matter of example 22, wherein the request-to-send includes at least one of a wireless link identifier associated with the request-to-send, a transmission sector identifier associated with the request-to-send, or a ranking based on the strengths.

Example 24 includes the subject matter of example 22, wherein the first strongest receiver sector is the same as the second strongest receiver sector and the strongest idle wireless link is the second wireless link.

Example 25 includes subject matter of example 22, wherein the signal determiner is to correlate the first wireless link with (A) the first transmission sector and (B) the first receiver sector, wherein the ranking includes the correlation.

Example 26 is an article of manufacture comprising instructions that, when executed, cause a machine to at least determine strengths of a first wireless link between a first transmission sector and a first receiver sector and a second wireless link between a second transmission sector and a second receiver sector, determine whether the first and second wireless links is busy or idle, select an idle wireless link of the plurality of wireless links based on the strengths of the first and second wireless links that are idle, and establish a transmission connection with the selected idle wireless link.

Example 27 includes the subject matter of example 26, wherein the instructions, when executed, cause the machine to transmit transmission packets to a plurality of receiver sectors, the plurality of receiver sectors including the first and second receiver sectors; and receive response packets from a subset of a plurality of receiver sectors, the plurality of receiver sectors including the first and second receiver sectors, wherein the determining of the strength of the first and second wireless links is based on at least one of a signal-to-noise ratio or a received signal strength indicator associated with the first and second wireless links.

Example 28 includes the subject matter of example 27, wherein each of the transmission packets includes at least one of (A) a wireless link identifier associated with a transmission packet or (B) a transmission sector identifier associated with the transmission packet.

Example 29 includes the subject matter of one of examples 26 or 27, wherein the instructions, when executed, cause the machine to rank a plurality of wireless links based on the strengths, the plurality of wireless links including the first and second wireless links.

Example 30 includes the subject matter of example 29, wherein the instructions, when executed, cause the machine to, when a strength of a wireless link of the plurality of wireless links is below a threshold strength, omit the wireless link from the ranking.

Example 31 includes the subject matter of example 26, wherein the instructions, when executed, cause the machine to determine whether the first and second wireless links are busy or idle is based on a clear channel assessment.

Example 32 includes the subject matter of example 26, wherein the instructions, when executed, cause the machine to: determine whether a strongest wireless link of the first and second wireless links is busy or idle; when the strongest wireless link is idle, establish a wireless link using the strongest wireless link; and when the strongest wireless link is busy, determine whether a next strongest wireless link of the plurality of wireless links is busy or idle.

Example 33 includes the subject matter of example 32, wherein the establishing of the transmission connection includes transmitting data using the strongest idle wireless link.

Example 34 includes the subject matter of one of examples 26 or 32, wherein the instructions, when executed, cause the machine to: transmit a request-to-send to a first strongest receiver sector associated with the strongest idle wireless link; and receive a clear-to-send from a second strongest receiver sector, wherein the transmission connection is established using a second strongest wireless link associated with the second strongest receiver sector.

Example 35 includes the subject matter of example 34, wherein the request-to-send includes at least one of a wireless link identifier associated with the request-to-send, a transmission sector identifier associated with the request-to-send, or a ranking based on the strengths.

Example 36 includes the subject matter of example 34, wherein the first strongest receiver sector is the same as the second strongest receiver sector and the strongest idle wireless link is the second wireless link.

Example 37 includes the subject matter of example 34, wherein the instructions, when executed, cause the machine to correlate the first wireless link with (A) the first transmission sector and (B) the first receiver sector, wherein the ranking includes the correlation.

Example 38 includes the subject matter of example 26, wherein the first and second wireless links are beamform links.

Example 39 is an apparatus comprising first means to determine strengths of a first wireless link between a first transmission sector and a first receiver sector and a second wireless link between a second transmission sector and a second receiver sector, second means to determine whether the first and second wireless links is busy or idle, third means to select an idle wireless link of the plurality of wireless links based on the strengths of the first and second wireless links that are idle, and fourth means to establish a transmission connection with the selected idle wireless link.

Example 40 includes the subject matter of example 39, further including fifth means, wherein the fourth means is to transmit transmission packets to a plurality of receiver sectors, the plurality of receiver sectors including the first and second receiver sectors, and the fifth means is to receive response packets from a subset of a plurality of receiver sectors, the plurality of receiver sectors including the first and second receiver sectors, wherein the first means is to determine of the strength of the first and second wireless links is based on at least one of a signal-to-noise ratio or a received signal strength indicator associated with the first and second wireless links.

Example 41 includes the subject matter of example 40, wherein each of the transmission packets includes at least one of (A) a wireless link identifier associated with a transmission packet or (B) a transmission sector identifier associated with the transmission packet.

Example 42 includes the subject matter of one of examples 39 or 40, wherein the first means is to rank a plurality of wireless links based on the strengths, the plurality of wireless links including the first and second wireless links.

Example 43 includes the subject matter of example 42, wherein the first means is to, when a strength of a wireless link of the plurality of wireless links is below a threshold strength, omit the wireless link from the ranking.

Example 44 includes the subject matter of example 39, wherein the clear channel assessment is to determine of whether the first and second wireless links are busy or idle is based on a clear channel assessment.

Example 45 includes the subject matter of example 39, wherein the second means is to determine whether a strongest wireless link of the first and second wireless links is busy or idle, and the fourth means to, when the strongest wireless link is idle, establishing a wireless link using the strongest wireless link, and, when the strongest wireless link is busy, determining whether a next strongest wireless link of the plurality of wireless links is busy or idle.

Example 46 includes the subject matter of example 45, wherein the fourth means is to transmit data using the strongest idle wireless link.

Example 47 includes the subject matter of one of examples 39 or 45, wherein the fourth means is to transmit a request-to-send to a first strongest receiver sector associated with the strongest idle wireless link, the fifth means is to receive a clear-to-send from a second strongest receiver sector, wherein the fourth means is establish transmission using a second strongest wireless link associated with the second strongest receiver sector.

Example 48 includes the subject matter of example 47, wherein the request-to-send includes at least one of a wireless link identifier associated with the request-to-send, a transmission sector identifier associated with the request-to-send, or a ranking based on the strengths.

Example 49 includes the subject matter of example 47, wherein the first strongest receiver sector is the same as the second strongest receiver sector and the strongest idle wireless link is the second wireless link.

Example 50 includes the subject matter of example 47, wherein the third means is to correlate the first wireless link with (A) the first transmission sector and (B) the first receiver sector, wherein the ranking includes the correlation.

Example 51 is a method comprising receiving a request-to-send from a first transmission sector of a plurality of transmission sectors associated with a first wireless link, and determining whether a plurality of wireless links is busy or idle, the plurality of wireless links including the first wireless link. Example 51 also comprises, when the first wireless link is a strongest idle wireless link of the plurality of wireless links, transmitting a clear-to-send to the first transmission sector associated with the first wireless link. Example 51 also comprises, when the first wireless link is not the strongest idle wireless link of the plurality of wireless links, transmitting the clear-to-send to a second transmission sector associated with a second wireless link associated with the strongest idle wireless link, the plurality of transmission sectors including the second transmission sector.

Example 52 includes the subject matter of example 51, wherein the transmitting of the clear-to-send is transmitted using a receiver sector of a plurality of receiver sectors.

Example 53 includes the subject matter of example 52, wherein the first wireless link and the first transmission sector is associated with a first receiver sector of the plurality of receiver sectors and the second wireless link and the second transmission sector is associated with a second receiver sector of the plurality of receiver sectors.

Example 54 includes the subject matter of example 51, wherein the request-to-send includes at least one of a transmission sector identifier or a wireless link identifier.

Example 55 includes the subject matter of example 51, wherein the request-to-send includes a strength ranking of the plurality of wireless links, the strength ranking based on an order of strengths for each of the plurality of wireless links.

Example 56 includes the subject matter of example 55, further including determining the strongest idle wireless link based on the strength ranking.

Example 57 includes subject matter of one of examples 51 or 55, wherein the determining of whether each of the plurality of wireless links is busy or idle is based on a clear channel assessment.

Example 58 includes subject matter of one of examples 51 or 55, wherein the clear-to-send establishes a transmission connection using the strongest idle wireless link.

Example 59 includes subject matter of one of examples 51 or 55, wherein the clear-to-send includes at least one of a wireless link identifier, a transmission sector identifier, or a receiver sector identifier.

Example 60 includes subject matter of one of examples 51 or 55, wherein the plurality of wireless links are beamform links.

Example 61 is an apparatus comprising a receiver to receive a request-to-send from a first transmission sector of a plurality of transmission sectors associated with a first wireless link and a clear channel assessment checker to determine whether a plurality of wireless links is busy or idle, the plurality of wireless links including the first wireless link. Example 36 also includes a transmitter to, when the first wireless link is a strongest idle wireless link of the plurality of wireless links, transmitting a clear-to-send to the first transmission sector associated with the first wireless link, and, when the first wireless link is not the strongest idle wireless link of the plurality of wireless links, transmitting the clear-to-send to a second transmission sector associated with a second wireless link associated with the strongest idle wireless link, the plurality of transmission sectors including the second transmission sector.

Example 62 includes the subject matter of example 61, wherein the transmitter is to transmit the clear-to-send using a receiver sector of a plurality of receiver sectors.

Example 63 includes the subject matter of example 62, wherein the first wireless link and the first transmission sector is associated with a first receiver sector of the plurality of receiver sectors and the second wireless link and the second transmission sector is associated with a second receiver sector of the plurality of receiver sectors.

Example 64 includes the subject matter of example 61, wherein the request-to-send includes at least one of a transmission sector identifier or a wireless link identifier.

Example 65 includes the subject matter of example 61, wherein the request-to-send includes a strength ranking of the plurality of wireless links, the strength ranking based on an order of strengths for each of the plurality of wireless links.

Example 66 includes the subject matter of example 65, further including a signal determiner to determine the strongest idle wireless link based on the strength ranking.

Example 67 includes subject matter of one of examples 61 or 65, wherein the clear channel assessment checker is to determine whether each of the plurality of wireless links is busy or idle is based on a clear channel assessment.

Example 68 includes subject matter of one of examples 61 or 65, wherein the clear-to-send establishes a transmission connection using the strongest idle wireless link.

Example 69 includes subject matter of one of examples 61 or 65, wherein the clear-to-send includes at least one of a wireless link identifier, a transmission sector identifier, or a receiver sector identifier.

Example 70 includes subject matter of one of examples 61 or 65, wherein the plurality of wireless links are beamform links.

Example 71 is an article of manufacture comprising instructions that, when executed, cause a machine to at least receive a request-to-send from a first transmission sector of a plurality of transmission sectors associated with a first wireless link, determine whether a plurality of wireless links is busy or idle, the plurality of wireless links including the first wireless link, when the first wireless link is a strongest idle wireless link of the plurality of wireless links, transmit a clear-to-send to the first transmission sector associated with the first wireless link, and when the first wireless link is not the strongest idle wireless link of the plurality of wireless links, transmit the clear-to-send to a second transmission sector associated with a second wireless link associated with the strongest idle wireless link, the plurality of transmission sectors including the second transmission sector.

Example 72 includes the subject matter of example 71, wherein the instructions, when executed, cause the machine to transmit the clear-to-send using a receiver sector of a plurality of receiver sectors.

Example 73 includes the subject matter of example 72, wherein the first wireless link and the first transmission sector is associated with a first receiver sector of the plurality of receiver sectors and the second wireless link and the second transmission sector is associated with a second receiver sector of the plurality of receiver sectors.

Example 74 includes the subject matter of example 71, wherein the request-to-send includes at least one of a transmission sector identifier or a wireless link identifier.

Example 75 includes the subject matter of example 71, wherein the request-to-send includes a strength ranking of the plurality of wireless links, the strength ranking based on an order of strengths for each of the plurality of wireless links.

Example 76 includes the subject matter of example 75, wherein the instructions, when executed, cause the machine to determine the strongest idle wireless link based on the strength ranking.

Example 77 includes the subject matter of one of examples 71 or 75, wherein the instructions, when executed, cause the machine to determine whether each of the plurality of wireless links is busy or idle based on a clear channel assessment.

Example 78 includes the subject matter of one of examples 71 or 75, wherein the clear-to-send establishes a transmission connection using the strongest idle wireless link.

Example 79 includes the subject matter of one of examples 71 or 75, wherein the clear-to-send includes at least one of a wireless link identifier, a transmission sector identifier, or a receiver sector identifier.

Example 80 includes the subject matter of one of examples 71 or 75, wherein the plurality of wireless links are beamform links.

Example 81 is an apparatus comprising first means to receive a request-to-send from a first transmission sector of a plurality of transmission sectors associated with a first wireless link, second means to determine whether a plurality of wireless links is busy or idle, the plurality of wireless links including the first wireless link, third means to, when the first wireless link is a strongest idle wireless link of the plurality of wireless links, transmitting a clear-to-send to the first transmission sector associated with the first wireless link, and, when the first wireless link is not the strongest idle wireless link of the plurality of wireless links, transmitting the clear-to-send to a second transmission sector associated with a second wireless link associated with the strongest idle wireless link, the plurality of transmission sectors including the second transmission sector.

Example 82 includes the subject matter of example 81, wherein the third means is to transmit the clear-to-send using a receiver sector of a plurality of receiver sectors.

Example 83 includes the subject matter of example 82, wherein the first wireless link and the first transmission sector is associated with a first receiver sector of the plurality of receiver sectors and the second wireless link and the second transmission sector is associated with a second receiver sector of the plurality of receiver sectors.

Example 84 includes the subject matter of example 81, wherein the request-to-send includes at least one of a transmission sector identifier or a wireless link identifier.

Example 85 includes the subject matter of example 81, wherein the request-to-send includes a strength ranking of the plurality of wireless links, the strength ranking based on an order of strengths for each of the plurality of wireless links.

Example 86 includes the subject matter of example 85, further including fourth means to determine the strongest idle wireless link based on the strength ranking.

Example 87 includes the subject matter of one of examples 81 or 85, wherein the second means is to determine whether each of the plurality of wireless links is busy or idle is based on a clear channel assessment.

Example 88 includes the subject matter of one of examples 81 or 85, wherein the clear-to-send establishes a transmission connection using the strongest idle wireless link.

Example 89 includes the subject matter of one of examples 81 or 85, wherein the clear-to-send includes at least one of a wireless link identifier, a transmission sector identifier, or a receiver sector identifier.

Example 90 includes the subject matter of one of examples 81 or 85, wherein the plurality of wireless links are beamform links.

What is claimed is:

1. A method comprising:
   determining strengths of a first wireless link between a first transmission sector of a first device and a first receiver sector of a second device and a second wireless link between a second transmission sector of the first device and a second receiver sector of the second device;
   determining whether the first and second wireless links are busy or idle;
   selecting an idle wireless link based on the strengths of the first and second wireless links that are idle; and
   establishing a transmission connection with the selected idle wireless link by:
      transmitting a request-to-send to a first strongest receiver sector associated with the strongest idle wireless link, the request-to-send including at least one of a wireless link identifier associated with the request-to-send, a transmission sector identifier associated with the request-to-send, or a ranking based on the strengths; and
      receiving a clear-to-send from a second strongest receiver sector, wherein the transmission connection is established using a second strongest wireless link associated with the second strongest receiver sector.

2. The method of claim 1, further including:
transmitting transmission packets to a plurality of receiver sectors, the plurality of receiver sectors including the first and second receiver sectors; and
receiving response packets from a subset of a plurality of receiver sectors, the plurality of receiver sectors including the first and second receiver sectors, wherein the determining of the strength of the first and second wireless links is based on at least one of a signal-to-noise ratio or a received signal strength indicator associated with the first and second wireless links.

3. The method of claim 2, wherein each of the transmission packets includes at least one of (A) a wireless link identifier associated with a transmission packet or (B) a transmission sector identifier associated with the transmission packet.

4. The method of claim 1, further including ranking a plurality of wireless links based on the strengths, the plurality of wireless links including the first and second wireless links.

5. The method of claim 4, further including, when a strength of a wireless link of the plurality of wireless links is below a threshold strength, omitting the wireless link from the ranking.

6. The method of claim 1, wherein the determining of whether the first and second wireless links are busy or idle is based on a clear channel assessment.

7. The method of claim 1, further including:
determining whether a strongest wireless link of the first and second wireless links is busy or idle;
when the strongest wireless link is idle, establishing a wireless link using the strongest wireless link; and
when the strongest wireless link is busy, determining whether a next strongest wireless link of a plurality of wireless links is busy or idle, the plurality of wireless links including the first and second wireless links.

8. The method of claim 7, wherein the establishing of the transmission connection includes transmitting data using the strongest idle wireless link.

9. The method of claim 1, wherein the first strongest receiver sector is the same as the second strongest receiver sector and the strongest idle wireless link is the second wireless link.

10. An apparatus comprising:
a wireless link comparator to determine strengths of a first wireless link between a first transmission sector of a first device and a first receiver sector of a second device and a second wireless link between a second transmission sector of the first device and a second receiver sector of the second device;
a clear channel assessment checker to determine whether the first and second wireless links is busy or idle;
a signal determiner to select an idle wireless link based on the strengths of the first and second wireless links that are idle;
a transmitter to establish a transmission connection with the selected idle wireless link by transmitting a request-to-send to a first strongest receiver sector associated with the strongest idle wireless link, the request-to-send including at least one of a wireless link identifier associated with the request-to-send, a transmission sector identifier associated with the request-to-send, or a ranking based on the strengths; and
a receiver to receive a clear-to-send from a second strongest receiver sector, wherein the transmission connection is established using a second strongest wireless link associated with the second strongest receiver sector.

11. The apparatus of claim 10, wherein:
the transmitter is to transmit transmission packets to a plurality of receiver sectors, the plurality of receiver sectors including the first and second receiver sectors; and
the receiver is to receive response packets from a subset of a plurality of receiver sectors, the plurality of receiver sectors including the first and second receiver sectors, wherein the wireless link comparator is to determine of the strength of the first and second wireless links is based on at least one of a signal-to-noise ratio or a received signal strength indicator associated with the first and second wireless links.

12. The apparatus of claim 11, wherein each of the transmission packets includes at least one of (A) a wireless link identifier associated with a transmission packet or (B) a transmission sector identifier associated with the transmission packet.

13. The apparatus of claim 10, wherein the wireless link comparator is to rank a plurality of wireless links based on the strengths, the plurality of wireless links including the first and second wireless links.

14. The apparatus of claim 13, wherein the wireless link comparator is to, when a strength of a wireless link of the plurality of wireless links is below a threshold strength, omit the wireless link from the ranking.

15. A non-transitory computer readable medium comprising instructions that, when executed, cause a machine to at least:
determine strengths of a first wireless link between a first transmission sector of a first device and a first receiver sector of a second device and a second wireless link between a second transmission sector of the first device and a second receiver sector of the second device;
determine whether the first and second wireless links is busy or idle;
select an idle wireless link based on the strengths of the first and second wireless links that are idle; and
establish a transmission connection with the selected idle wireless link by:
transmitting a request-to-send to a first strongest receiver sector associated with the strongest idle wireless link, the request-to-send including at least one of a wireless link identifier associated with the request-to-send, a transmission sector identifier associated with the request-to-send, or a ranking based on the strengths; and
receiving a clear-to-send from a second strongest receiver sector, wherein the transmission connection is established using a second strongest wireless link associated with the second strongest receiver sector.

16. The non-transitory computer readable medium of claim 15, wherein the instructions, when executed, cause the machine to:
transmit transmission packets to a plurality of receiver sectors, the plurality of receiver sectors including the first and second receiver sectors; and
receive response packets from a subset of a plurality of receiver sectors, the plurality of receiver sectors including the first and second receiver sectors, wherein the determining of the strength of the first and second wireless links is based on at least one of a signal-to-noise ratio or a received signal strength indicator associated with the first and second wireless links.

17. A method comprising:
receiving a request-to-send from a first transmission sector of a plurality of transmission sectors associated with a first wireless link, the request-to-send including a strength ranking of a plurality of wireless links, the strength ranking based on an order of strengths for each of the plurality of wireless links;
determining whether the plurality of wireless links is busy or idle, the plurality of wireless links including the first wireless link;
when the first wireless link is a strongest idle wireless link of the plurality of wireless links, transmitting a clear-to-send to the first transmission sector associated with the first wireless link; and
when the first wireless link is not the strongest idle wireless link of the plurality of wireless links, transmitting the clear-to-send to a second transmission sector associated with a second wireless link associated with the strongest idle wireless link, the plurality of transmission sectors including the second transmission sector.

18. The method of claim 17, wherein the transmitting of the clear-to-send is transmitted using a receiver sector of a plurality of receiver sectors.

19. The method of claim 18, wherein the first wireless link and the first transmission sector is associated with a first receiver sector of the plurality of receiver sectors and the second wireless link and the second transmission sector is associated with a second receiver sector of the plurality of receiver sectors.

20. The method of claim 17, wherein the request-to-send includes at least one of a transmission sector identifier or a wireless link identifier.

\* \* \* \* \*